(12) United States Patent
Inada

(10) Patent No.: US 12,162,133 B2
(45) Date of Patent: Dec. 10, 2024

(54) MASSAGE SYSTEM AND MASSAGE DEVICE

(71) Applicant: FAMILY INADA CO., LTD, Osaka (JP)

(72) Inventor: Nichimu Inada, Osaka (JP)

(73) Assignee: FAMILY INADA CO., LTD., Osaka (JP)

( * ) Notice: Subject to any disclaimer, the term of this patent is extended or adjusted under 35 U.S.C. 154(b) by 396 days.

(21) Appl. No.: 17/528,202

(22) Filed: Nov. 17, 2021

(65) Prior Publication Data
US 2022/0234210 A1    Jul. 28, 2022

(30) Foreign Application Priority Data

Jan. 27, 2021  (JP) .................. 2021-011543
Jan. 27, 2021  (JP) .................. 2021-011544

(51) Int. Cl.
*B25J 11/00*      (2006.01)
*A61H 7/00*       (2006.01)
(Continued)

(52) U.S. Cl.
CPC .............. *B25J 11/008* (2013.01); *A61H 7/00* (2013.01); *B25J 9/1679* (2013.01); *B25J 13/003* (2013.01); *B25J 9/0087* (2013.01)

(58) Field of Classification Search
CPC .............. A61H 7/00; A61H 2201/0142; A61H 2201/1207; A61H 2201/1659; A61H 2201/1669; A61H 2201/5002; A61H 2201/501; A61H 2201/5035; A61H 2201/5038; A61H 2201/5048; A61H 2201/5061; A61H 2201/5092; A61H 2201/5094; A61H 2201/5097; A61H 2203/0443; A61H 2230/855; A61H 7/007; (Continued)

(56) References Cited

U.S. PATENT DOCUMENTS 10,959,911 B2 *  3/2021  Wersland .................. A61H 1/00
11,819,296 B1 * 11/2023  Silver .................... A61H 7/001
(Continued)

FOREIGN PATENT DOCUMENTS

CN    110946746 A  *  4/2020
CN    110960414 A  *  4/2020
(Continued)

OTHER PUBLICATIONS

CN-110946746-A translation (Year: 2020).*
CN-110960414-A translation (Year: 2020).*
KR-20200110021-A Translation (Year: 2020).*

*Primary Examiner* — Kyle T Johnson
(74) *Attorney, Agent, or Firm* — WTA Patents (57) ABSTRACT

Provided is a massage system for a massage facility in which a robot arm is provided and a massage is performed with respect to a user by the robot arm, the system including a control unit configured to cause the robot arm to perform a massage operation in response to a program, and a setting unit configured to receive a setting operation of a setting position used for the massage operation from an operator, in which the control unit is configured to cause the robot arm to perform the massage operation with respect to a treatment position based on the setting position.

12 Claims, 6 Drawing Sheets

(51) Int. Cl.
*B25J 9/00* (2006.01)
*B25J 9/16* (2006.01)
*B25J 13/00* (2006.01)

(58) Field of Classification Search
CPC ..... A61H 23/006; A61H 23/02; B25J 11/008; B25J 9/1679; B25J 13/003; B25J 9/0087; B25J 5/02; B25J 9/0084
See application file for complete search history.

(56) References Cited

U.S. PATENT DOCUMENTS

| | | | |
|---|---|---|---|
| 2017/0079871 A1* | 3/2017 | Zhang | G16H 40/63 |
| 2017/0266077 A1* | 9/2017 | Mackin | A61G 13/1235 |
| 2018/0008359 A1* | 1/2018 | Randle | A61B 34/32 |
| 2020/0035237 A1* | 1/2020 | Kim | G06V 40/161 |
| 2021/0228793 A1* | 7/2021 | Scarpaci | A61M 1/159 |
| 2022/0161441 A1* | 5/2022 | Harashima | B25J 19/028 |
| 2022/0234210 A1* | 7/2022 | Inada | B25J 11/008 |
| 2022/0354731 A1* | 11/2022 | Gruszka del los Rios | A61H 7/004 |

FOREIGN PATENT DOCUMENTS

| | | | | |
|---|---|---|---|---|
| JP | 6733973 B1 | 8/2020 | | |
| KR | 20200110021 A * | 9/2020 | ............ | A61H 7/007 |

* cited by examiner

MASSAGE SYSTEM AND MASSAGE DEVICE

CROSS-REFERENCE TO RELATED APPLICATIONS

This application claims priority to Japanese Patent Application No. 2021-011543, filed on Jan. 27, 2021, and Japanese Patent Application No. 2021-011544, filed on Jan. 27, 2021, which are incorporated by reference herein in their entirely.

TECHNICAL FIELD

Certain embodiments of the present disclosure relate to a massage system and a massage device.

BACKGROUND

Massage refers to an act of giving a physical stimulus to a person being treated, and is typically performed by a therapist who is called a masseur or the like. Depending on the massage technique being applied, massage may be physically demanding on the therapist.

Hence, the use of a robot body care system where a robot hand is used to provide massage instead of a human therapist has been proposed in the related art.

SUMMARY

According to an embodiment of the present invention, a massage system for a massage facility has a robot arm to perform a massage on a user. The system includes a control unit configured to cause the robot arm to perform a massage operation according to a program, and a setting unit configured to receive a setting operation of a setting position used for the massage operation from an operator. The control unit is configured to cause the robot arm to perform the massage operation with respect to a treatment position based on the setting position. More details will be described as an embodiment described below.

According to another embodiment of the present invention, a massage device for a massage facility performs a pre-finishing massage on a person being treated. Then, a therapist performs a finishing massage after treatment of the pre-finishing massage. The device includes a computing device configured to generate provision information provided to the therapist for the finishing massage from information obtained during the treatment of the pre-finishing massage, and outputs the provision information after the treatment of the pre-finishing massage. More details will be described as an embodiment described below.

DETAILED DESCRIPTION

First, a massage device (also referred to as "body care device") as proposed in the related art is a device provided separately from a treatment table, and is set to the treatment table for use. That is, a position of the massage device with respect to the person being treated who lies on the treatment table is not fixed. As a result, when the position of the massage device with respect to the person being treated is different from a predetermined treatment position, the desired massage effect may not be achieved even after the massage device performs a massage operation according to a program. Therefore, it is desirable to have a massage system to be appropriately installed according to the treatment position of the person being treated.

Secondly, it is assumed that in addition to the massage operation by the robot hand according to the program, the massage by the therapist such as the masseur or the like is additionally performed. In this case, it is desirable to have the massage given by the therapist to be effective based on the massage operation performed by using the robot hand according to the program.

1. Overview of Massage System and Massage Device (1) A massage system according to an embodiment is for a massage facility in which a robot arm is provided and a massage is performed with respect to a user by the robot arm. The system includes a control unit configured to cause the robot arm to perform a massage operation according to a program, and a setting unit configured to receive a setting operation of a setting position used for the massage operation from an operator. The control unit is configured to cause the robot arm to perform the massage operation with respect to a treatment position based on the setting position.

The massage facility refers to a facility where a therapist can perform a massage on a user. The massage facility is, for example, a massage shop, an acupuncture and moxibustion clinic, a beauty treatment salon, an osteopathic clinic, and the like. The therapist is a person who performs the massage on the user, and includes, for example, a masseur, an esthetician, a chiropractor, or a bonesetter.

The setting operation of the setting position is performed by, for example, a person other than the person being treated. The person other than the person being treated is, for example, a therapist, such as a masseur or the like, or a staff member of the massage facility.

The setting position is a position used for the massage operation in the massage device including the robot arm, and can include, for example, a reference position depending on the physique of the user. Further, the setting position can include a specific position as a position for designating an adjustment of the massage operation. The specific position refers to, for example, a focused treatment position such as a place of stiffness, a treatment contraindication position such as a place in which the massage is not desirable, and the like.

In the massage system, the massage operation is performed by the robot arm with respect to the treatment position obtained from the setting position used for the massage operation as set by the setting operation of the operator. That is, the robot arm can be appropriately positioned at the treatment position of the person being treated. As a result, the massage can be performed in the treatment position suitable for the user.

The setting position may include the reference position depending on the physique of the user. The reference position is a position depending on the physique of the user, for example, a shoulder position, a waist position, an acupuncture point position, and the like. By setting these positions, the physique of the user is identified, and the massage operation with respect to the appropriate treatment position is performed.

(3) The setting position may include the specific position for designating the adjustment of the massage operation. The adjustment of the massage operation includes, for example, an adjustment of at least one of the intensity and the content of the massage. The content of the massage may include, for example, a massage position, a skill corresponding to the massage operation, or the like. The specific position includes, for example, the focused treatment position such as the place with stiffness, the treatment contraindication position such as the place in which the massage is not desirable, and the like. As a result, the massage suitable for the user or the massage desired by the user can be performed.

(4) The setting position may include a reference position depending on the physique of the user and a specific position for designating an adjustment of the massage operation, and the setting unit is configured to separately set the reference position and the specific position. As a result, both the reference position and the specific position can be set.

(5) The control unit may be configured to identify the setting position by having an operator guides the robot arm. That is, the operator can perform the setting operation of the setting position by using the robot arm.

(6) The robot arm may be placed in a setting mode in which a guiding motion can be performed, when the setting position is set. The setting mode is, for example, a state in which the position of the robot arm can be moved by a human hand, and, as an example, a state in which a lock that restricts a movement is released. As a result, the operator can perform the setting operation of the setting position by using the robot arm.

(7) The setting unit may include an operation unit that is disposed at a position at which the setting unit is operable during the guiding motion and configured to decide that a position of the robot arm is the setting position. An operation unit involves contact with the operator, such as a button. The operator easily operates the setting unit during the guiding motion by disposing the setting unit at a position at which the setting unit is operable during the guiding motion.

(8) The massage system may further include a reading device configured to read a marker, in which the control unit is configured to recognize the setting position by reading the marker installed at a position that corresponds to the setting position, of a body of the user by the reading device. For example, the reading device is a camera. The setting position can be set by reading the marker by the reading device.

(9) A massage device according to an embodiment is for a massage facility where a pre-finishing massage is performed by the massage device on a person being treated and a finishing massage is performed by a therapist after treatment of the pre-finishing massage. The device includes a computing device configured to generate provision information to be provided to the therapist for the finishing massage from information obtained during the treatment of the pre-finishing massage, and outputs the provision information after the treatment of the pre-finishing massage.

The massage facility is, for example, the massage shop, the acupuncture and moxibustion clinic, the beauty treatment salon, the osteopathic clinic, and the like, and is a facility in which the massage can be performed by, for example, the therapist such as a masseur, a esthetician, a chiropractor, or a bonesetter who performs the massage with respect to the person being treated.

By generating and outputting the provision information to the therapist for the finishing massage, the therapist can perform the finishing massage based on the provision information. As a result, the therapist can effectively perform the finishing massage based on the massage operation of the pre-finishing massage.

(10) The provision information may include information indicating a treatment content of the pre-finishing massage. As a result, the therapist can effectively perform the finishing massage based on the treatment content of the pre-finishing massage.

(11) The provision information may include information indicating a treatment effect of the pre-finishing massage. The information indicating the treatment effect includes, for example, information indicating the state of the person's body being treated after the treatment, and specifically, information indicating a portion in which stiffness is eliminated, a portion in which the stiffness remains, and the like. As an example, these pieces of information may be output as a map schematically showing the body of the person being treated. As a result, the therapist can perform the finishing massage based on the treatment effect of the pre-finishing massage.

(12) The massage device may further include a microphone. The computing device is configured to provide voice data obtained by the microphone during a period related to the treatment of the pre-finishing massage to a learning model. The learning model is machine-trained to provide output information with respect to input of the voice data. The computing device obtains the output information provided from the learning model, and the provision information includes the output information.

The period related to the treatment of the pre-finishing massage includes at least one of a period during the massage operation of the pre-finishing massage, a period after the massage operation of the pre-finishing massage, and a period before the massage operation of the pre-finishing massage. The provision information can be easily generated by using the learning model.

(13) The voice data may include data indicating the treatment effect of the pre-finishing massage obtained from utterance of the person being treated. As a result, the treatment effect of the pre-finishing massage can be obtained from the voice data, and the provision information can be generated based on the treatment effect.

(14) The massage device may further include a speaker. The computing device is configured to output voice for a dialogue with the person being treated through the speaker during the period related to the treatment of the pre-finishing massage. As a result, the voice data of a dialogue type is obtained from the person being treated during the period related to the treatment of the pre-finishing massage. As a result, the treatment effect of the pre-finishing massage can be obtained, and can be used to generate the provision information.

(15) The computing device may be configured to store the provision information in association with specific information of the person being treated in a storage device that can be accessed by another device. The other device may be, for example, a terminal device carried by the therapist. As a result, the therapist can obtain the provision information even when the therapist is in a location different from a location where the pre-finishing massage is performed. As a result, for example, it is possible to perform the pre-finishing massage and the finishing massage in different locations.

2. Examples of Massage System and Massage Device

Figure 1:
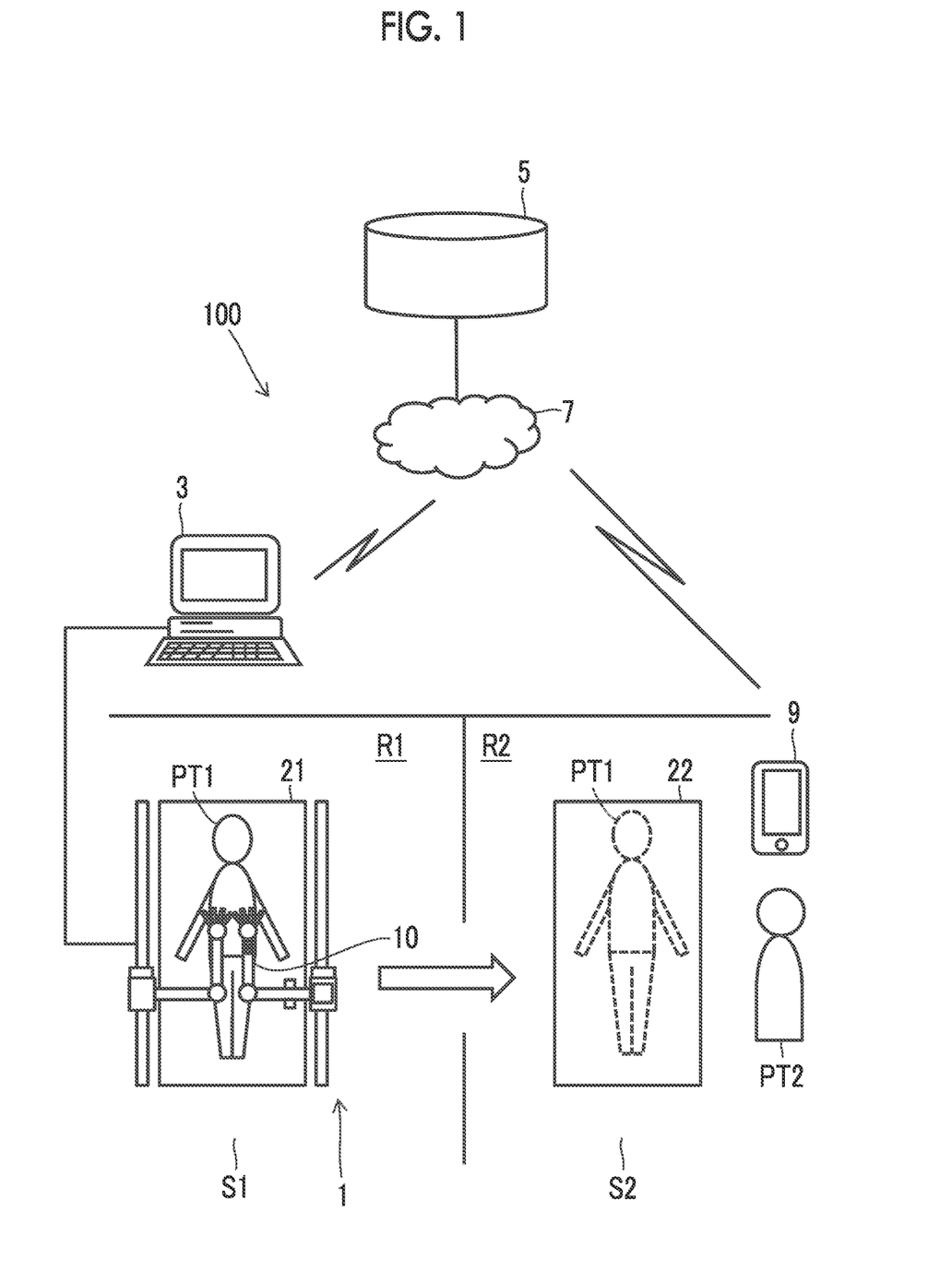
FIG. 1 is a schematic diagram showing overview of a massage system and a manner of using the massage system, according to an embodiment.

With reference to FIG. 1, a massage system 100 (hereinafter referred to also as "system 100") according to the present embodiment includes a massage device 1 with a robot arm 10. The system 100 performs the massage on a user (person being treated) PT1 by the robot arm 10.

The system 100 is assumed to be used in a massage facility. The massage facility is a facility in which massage can be performed on the user PT1 by a therapist PT2. The massage facility is, for example, a massage shop, a acupuncture and moxibustion clinic, a beauty treatment salon, a osteopathic clinic, and the like. The therapist PT2 is a person who performs the massage on the user, for example, a massager, a esthetician, a chiropractor, or a bonesetter.

The system 100 is used to perform a first massage on the user PT1 using the massage device 1 (step S1) and then a second massage by the therapist PT2 (step S2). The massage with respect to the user PT1 may be terminated with the second massage subsequent to the first massage, or the first massage may be further performed after the second massage.

The first massage is an automatic massage, which is automatically performed by the massage device 1. The second massage is a manual massage by the therapist PT2, which is performed after the first massage. In other words, the second massage is the finishing massage of the first massage, and the first massage is the pre-finishing massage. In the following examples, the first massage is the pre-finishing massage by the massage device 1, and the second massage is the finishing massage by the therapist PT2.

The massage device 1 has a movement function, as described below, and can be moved with respect to a treatment table. When the massage is performed on the user PT1, the massage device 1 is moved and set to the treatment table on which the user PT1 lies.

The treatment table is a table on which the user PT1 who receives the massage lies, and may be, for example, any one of a bed type, a mat type, or a treatment chair type. Lying on the treatment table refers to lying down on a bed or a mat when the treatment table is the bed or the mat, and sitting on a treatment chair when the treatment table is the treatment chair. In the following description, the treatment table is the bed, and the user PT1 lies down on the bed to receive the treatment. Note that lying down can include both facing downward or facing upward. In the following description, lying down refers to facing downward.

In an example of FIG. 1, the user PT1 being treated lies down on a bed 21 installed in a first massage room R1. In step S1, the massage device 1 is set on the bed 21 and the treatment of the pre-finishing massage is performed on the user PT1. Thereafter, in the example of FIG. 1, the user PT1 moves to a second massage room R2 and lies down on a bed 22. As another example, the user PT1 may stay in the first massage room R1 and the therapist PT2 may enter the first massage room R1 to perform the finishing massage. In this case, the massage device 1 may be moved to another massage room (not shown) for use, or may be used on another user in the first massage room R1. In step S2, the treatment of the finishing massage is performed with respect to the user PT1 by the therapist PT2 in the second massage room R2.

The system 100 includes a computing device 3. A computing device 3 is connected to the massage device 1 via by wired or wireless communication, and functions as a control unit that causes the robot arm 10 to perform the massage operation in response to a program. In the example of FIG. 1, the computing device 3 is a device different from the massage device 1. As another example, the computing device 3 may be embedded in the massage device 1.

The computing device 3 can communicate with another device via a network 7 such as the Internet. As an example, the computing device 3 is accessible to a server 5. Note that in a case the server 5 is a storage device mounted on the computing device 3, the computing device 3 need not be capable of communicating with another device.

The server 5 may be accessed by another device. In the example of FIG. 1, a terminal device 9 may access the server 5. As an example, the terminal device 9 may be a terminal device carried by the therapist PT2, and specifically, a smartphone, a tablet terminal, or the like.

Figure 2:
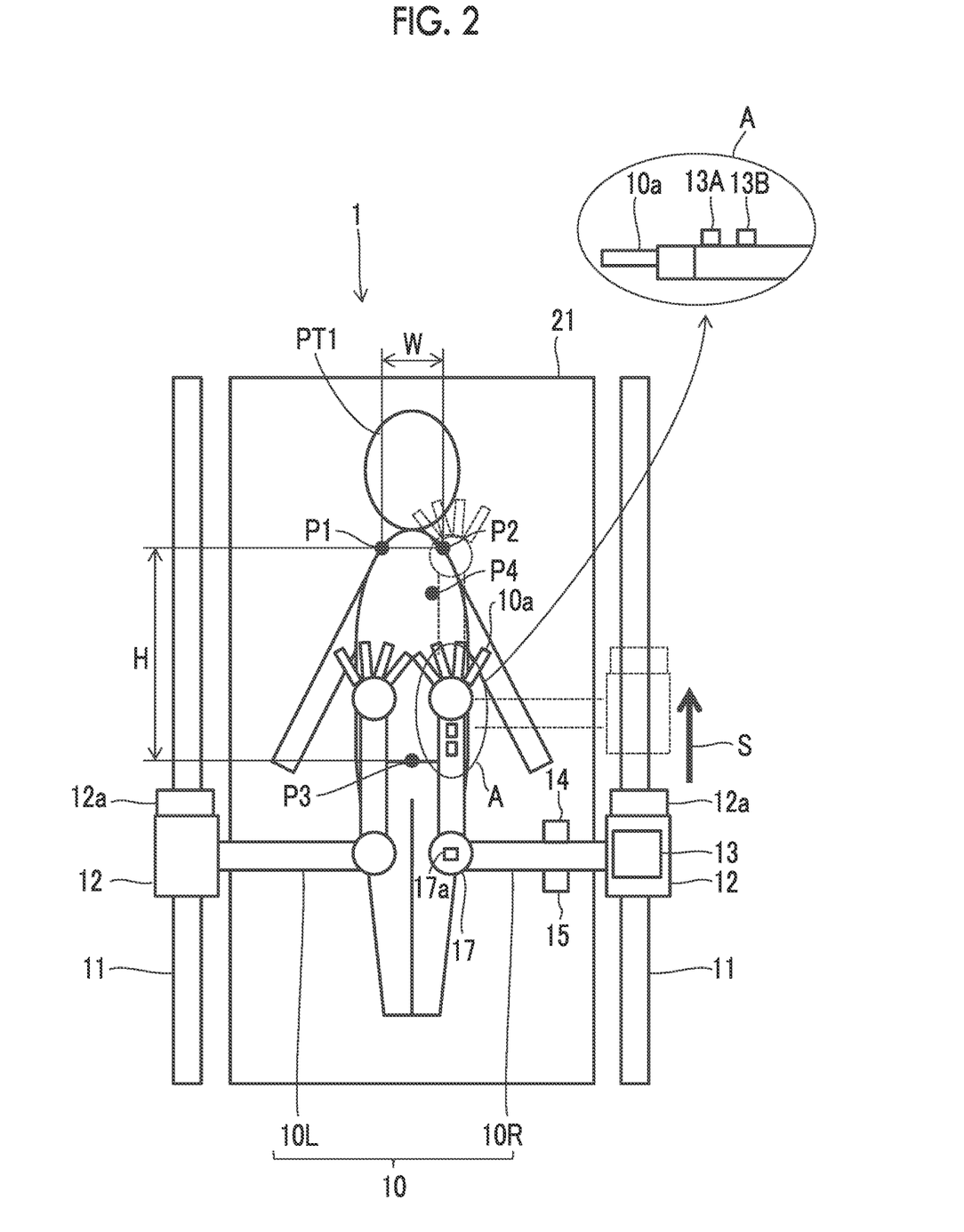
FIG. 2 is a diagram describing a configuration of a massage device included in the massage system and a setting operation of a setting position by using a robot arm of the massage device, according to one embodiment.

As an example, the massage device 1 is installed in a vicinity of the bed 21 such that the treatment of the massage can be performed on the user PT1 lying down on the bed 21. FIG. 2 is a schematic diagram of a state in which the massage device 1 is disposed on the bed 21, and is a view taken from above.

With reference to FIG. 2, the massage device 1 includes the robot arm 10. The robot arm 10 is formed by one or more robot arms. The robot arm 10 includes, as an example, a pair of left and right robot arms 10L and 10R. The robot arms 10L and 10R can be individually referred to as the robot arm 10 hereinafter. As another example, the robot arm 10 may be include three or more robot arms. In yet another example, the robot arm 10 may be only include one robot arm.

The robot arm 10 is connected to a movement device 12. As an example, a base end of the robot arm 10 is connected to the movement device 12. The movement device 12 is configured to move the robot arm 10 with respect to the bed 21.

The movement of the robot arm 10 with respect to the bed 21 includes a movement of the robot arm 10 to the vicinity of the bed 21. For this movement, the movement device 12 includes, as an example, a caster (not shown) provided at a position relative to a floor surface. The caster may be rotated in response to a control signal from the computing device 3, or may be rotated manually by the operator such as the therapist PT2. As a result, the robot arm 10 can be moved from a position away from the bed 21 to the vicinity of the bed 21.

The movement of the robot arm 10 with respect to the bed 21 includes a movement in a longitudinal direction of the bed 21. For this movement, the movement device 12 is configured to be movable along a rail 11 installed parallel to the longitudinal direction of the bed 21, as an example. It is assumed that a positional relationship of the rail 11 with respect to the bed 21 is predetermined and stored in the computing device 3.

The movement device 12 moves the robot arm 10 along the rail 11 in a direction, an amount of movement, and a movement speed in response to the control signal from the computing device 3. As a result, the robot arm 10 connected to the movement device 12 can be moved in the longitudinal direction of the bed 21.

The robot arm 10 includes a treatment unit. The robot arm 10 includes one or more joints 17 that can be rotated in multiple directions. The rotation in multiple directions may be realized by combining a plurality of uniaxially rotating joints, or may be realized by one or more joints that can be rotated in multiple directions, respectively. In addition, the joint 17 may be a ball joint. In an example of FIG. 2, the robot arm 10 includes one joint 17 that can be rotated in multiple directions. The joint 17 is rotated in a rotation direction, an amount of rotation, and a rotation speed in response to the control signal from the computing device 3.

Due to the joint 17 that is rotated in the rotation direction with the amount of rotation and the rotation speed determined in response to the control signal from the computing device 3, a position of the treatment unit with respect to the base end of the robot arm 10 is changed. Here, the position includes a position on a plane parallel to the bed 21 and a position in a height direction.

The treatment unit is, as an example, a massage hand 10a, which is provided at a distal end of the robot arm 10. The massage hand 10a includes a drive mechanism (not shown) and is driven in response to the control signal from the computing device 3 at a position held by the robot arm 10. As a result, the massage hand 10a is operated in contact with the treatment position of the user PT1 at a predetermined pressure to provide a physical stimulus. The operation of the massage hand 10a includes, as an example, a kneading or tapping operation.

The robot arm 10 is moved in the longitudinal direction of the bed 21 in response to the control signal from the computing device 3, and the joint 17 is rotated, so that the massage hand 10a installed at the distal end of the robot arm 10 is moved to a position in response to the control signal from the computing device 3. As a result, the massage hand 10a can perform the massage operation with respect to the treatment position of the user PT1.

The computing device 3 receives signals indicating the rotation direction, the amount of rotation, and the rotation speed from the joint 17 of the robot arm 10. In addition, the computing device 3 receives a signal indicating a driving status from the drive mechanism (not shown) of the massage hand 10a. Further, the computing device 3 receives signals indicating the movement direction, the amount of movement, and the movement speed from the movement device 12.

The computing device 3 is configured to identify the position of the massage hand 10a based on the signals from the movement device 12 and the signal from the joint 17 of the robot arm 10. That is, the computing device 3 identifies the position of the base end of the robot arm 10 with respect to the bed 21 based on the signals from the movement device 12, and identifies the position of the massage hand 10a with respect to the base end of the robot arm 10 based on the signals from the joint 17. As a result, the computing device 3 can identify the position of the massage hand 10a with respect to the bed 21.

The massage hand 10a may include a sensor (not shown) that provides a sensor signal to the computing device 3. The sensor is, for example, a pressure sensor. The pressure sensor detects a pressure received from the treatment position of the user PT1 and provides a signal indicating a result of detection to the computing device 3. In another example, the sensor is a rotation sensor. The rotation sensor detects a rotation torque or a rotation speed of a motor required for the kneading operation or the tapping operation of the massage hand 10a, and provides the signal indicating the result of detection to the computing device 3.

The sensor detects reaction force of the treatment by the massage hand 10a, and specifically, detects the reaction force of the treatment which is changed depending on hardness (that is, a degree of stiffness) of a treatment site. In other words, information indicated by the sensor signal may be information indicating the treatment effect of the massage hand 10a.

In the massage device 1, two operation modes of an operation mode for performing the massage operation (hereinafter, also referred to as a massage mode) and an operation mode for performing a position setting with respect to the user PT1 (hereinafter, also referred to as a setting mode) are provided.

Figure 3:
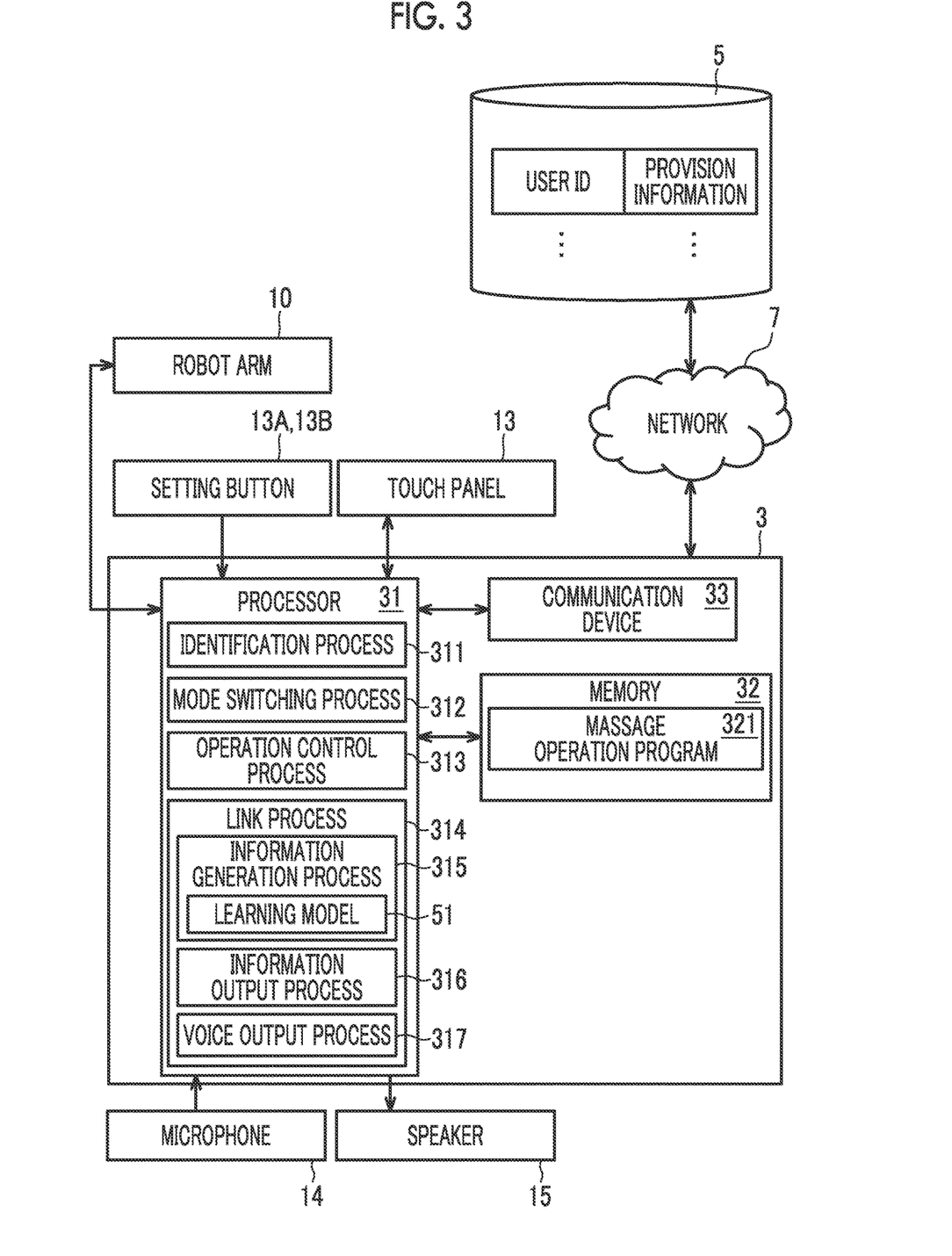
FIG. 3 is a schematic block diagram showing a configuration of a computing device included in the massage system, according to one embodiment.

In the massage mode, the computing device 3 controls the movement of the movement device 12 and the joint 17 of the robot arm 10 in order to set the massage hand 10a at the treatment position according to a massage operation program 321 (FIG. 3). As a result, the massage hand 10a can be moved to a position suitable for the massage with respect to the user PT1.

In the setting mode, the computing device 3 does not control the drive of the movement device 12 and the joint 17 of the robot arm 10. As a result, the robot arm 10 or the massage hand 10a can be moved by the guiding motion of the operator (e.g., therapist PT2). The guiding motion by the operator may be pushing of the robot arm 10 or the massage hand 10a in a movement direction of the operator's hand, rotating of the joint 17 of the robot arm 10, and the like.

In the setting mode, the computing device 3 identifies the position of the massage hand 10a with respect to the bed 21 based on the signals from the movement device 12 and the signals from the joint 17 of the robot arm 10. As a result, the position of the massage hand 10a moved by the guiding motion of the operator with respect to the bed 21 is identified.

It is preferable that the movement device 12 include a lock unit 12a. The lock unit 12a is a mechanism that switches the movement device 12 between a state in which the guide by the operator can be performed and a state in which the guide by the operator cannot be performed. As an example, the lock unit 12a is a lock mechanism that inhibits (lock-on) or releases (lock-off) the movement along the rail 11. Specifically, the lock unit 12a performs the lock-on in the massage mode and performs the lock-off in the setting mode. The lock-on may be to physically inhibit the movement, or may be to return the movement device 12 moved by the guide to the position before the movement by the computing device 3.

Also, the joint 17 of the robot arm 10 may also include a similar lock unit 17a. The lock unit 17a is a mechanism that switches the rotation of the joint 17 between a rotatable state by the guide by the operator and a non-rotatable state.

In an example, the lock units 12a and 17a are switched between the lock-on and the lock-off in response to the control signal from the computing device 3. Switching between the lock-on and the lock-off may be performed by the operation of the operator with respect to the operation unit, which will be described below. As a result, in the massage mode, the robot arm 10 is not moved even when a hand or the like accidentally hits the robot arm 10, and the massage operation is continued.

The massage device 1 includes a touch panel 13 as an example of the operation unit that receives the operation by the operator. The operation by the operator includes the setting operation of the setting position, which will be described below.

The touch panel 13 is disposed at a position that is easily operated by the operator, and is disposed at a base of the robot arm 10 as an example. As a result, the operator in the vicinity of the bed 21 may easily manipulate the touch panel 13.

The touch panel 13 provides an operation signal in response to a user operation to the computing device 3. The computing device 3 executes a process in response to the operation signal. The user operation on the touch panel 13 is, for example, an operation for designating a result of selection of a massage course. In this case, the computing device 3 executes a process in response to the program corresponding to the selected massage course indicated by the operation signal. As a result, the massage course is selected, and the pre-finishing massage in response to the selected massage course is performed on the user PT1.

It is preferable that the massage device 1 include setting buttons 13A and 13B as an example of the operation unit that receives the operation by the operator. The setting buttons 13A and 13B are buttons for providing an instruction for the reference position, which will be described below, and for providing an instruction for the specific position, which will be described below, respectively.

The setting buttons 13A and 13B are disposed at positions in which the operation can be performed by the operator during the guiding motion of the robot arm 10. For example, as shown in an enlarged view of a part A of FIG. 2, the robot arm 10R is disposed in the vicinity of the massage hand 10a. As a result, the operator easily performs the operation during the guiding motion of the robot arm 10 in a state in which the hand touches the massage hand 10a in order to set the reference position or the specific position. Note that in another example, the setting buttons 13A and 13B may be provided on the other robot arm 10L, or may be provided on each of the robot arm 10R and the robot arm 10L.

The setting buttons 13A and 13B provide the operation signals in response to an operation by the operator or the like to the computing device 3. The computing device 3 executes a process in response to the operation signal. The user operation for the setting buttons 13A and 13B is the setting operation of the setting position, which will be described below. In this case, the computing device 3 executes an identification process, which will be described below, by using the operation signal.

The massage device 1 includes a microphone 14. The microphone 14 receives the input of the voice by the utterance of the user PT1 lying on the bed 21 and transfers the voice data to the computing device 3. As a result, the microphone 14 is disposed at a position in which the voice from the user PT1 facing downward can be provided to the bed 21.

The massage device 1 includes a speaker 15. The speaker 15 outputs the voice based on the voice data transferred from the computing device 3 in response to the control signal from the computing device 3. The speaker 15 is disposed at a position in which the voice can reach the user PT1 facing downward on the bed 21.

With reference to FIG. 3, the computing device 3 includes a processor 31 and a memory 32. For example, the processor 31 is a central processing unit (CPU). The memory 32 includes a flash memory, an EEPROM, a ROM, a RAM, and the like. Alternatively, the memory 32 may be a primary storage device, or may be a secondary storage device.

The memory 32 stores the massage operation program 321 executed by the processor 31. By executing the massage operation program 321, the processor 31 executes an operation process for causing the massage device 1 to perform the pre-finishing massage (hereinafter, abbreviated as an operation process).

The computing device 3 includes a communication device 33 capable of communicating with another device such as the server 5 via the network 7. Note that when the server 5 is mounted on the computing device 3, the computing device 3 does not have to include the communication device 33.

The operation process executed by the processor 31 includes an identification process 311. The identification process 311 includes a process of identifying the setting position. The setting position is a position used for the massage operation in the massage device 1, and includes the reference position depending on the physique of the user PT1. A setting method will be described below.

The operation process includes a mode switching process 312. The mode switching process 312 includes switching between the massage mode and the setting mode. To switch between the massage mode and the setting mode, specifically, the processor 31 outputs, to the lock unit 12a, the control signal for performing the lock-on of the lock unit 12a of the movement device 12 in the massage mode and performing lock-off of the lock unit 12a of the movement device 12 in the setting mode.

The operation process includes an operation control process 313. The operation control process 313 includes a process of causing the massage device 1 to perform the massage operation. In the operation control process 313, the processor 31 outputs the control signal for moving the robot arm 10 to the movement device 12 and/or the joint 17 of the robot arm 10 in response to the program for causing the massage operation designated by the operation signal from the touch panel 13, for example. Further, in the operation control process 313, the processor 31 outputs the control signal for operating the massage hand 10a to the drive mechanism (not shown) of the massage hand 10a.

The operation process includes a link process 314. The link process 314 refers to a process of linking the pre-finishing massage by the massage device 1 and the finishing massage, which is subsequently performed, by the therapist PT2. The link process 314 includes an information generation process 315. The information generation process 315 includes generation of the provision information to be provided to the therapist PT2.

The provision information includes the information indicating the treatment content of the pre-finishing massage. For example, the information indicating the treatment content of the pre-finishing massage includes information indicating a selected massage course, information indicating an actual operation time, and the like. By including these pieces of information indicating the treatment content of the pre-finishing massage in the provision information, in the finishing massage, the therapist PT2 can perform the finishing massage based on the treatment content of the pre-finishing massage.

The provision information includes the information indicating the treatment effect of the pre-finishing massage. For example, the information indicating the treatment effect of the pre-finishing massage includes a value obtained by the sensors described above such as the pressure sensor or the rotation sensor during the massage operation, the information based on the voice data obtained by the microphone 14 during the massage operation, and the like. The information indicating the treatment effect is, specifically, the information indicating the state of the body of the user PT1 after the treatment, for example, a portion in which stiffness is eliminated, a portion in which the stiffness remains, and the like. These pieces of information included in the provision information may be output as the map schematically showing the body of the user PT1.

By including the information indicating the treatment effect of the pre-finishing massage in the provision information, the therapist PT2 can perform the finishing massage in the finishing massage based on the treatment effect of the pre-finishing massage. Note that a specific generation method will be described below.

The link process 314 includes an information output process 316. The information output process 316 includes output of the provision information after the treatment of the pre-finishing massage. An output destination may be the terminal device 9 carried by the therapist PT2. As a result, the provision information is provided to the therapist PT2.

The output destination may be the server 5. In this case, the processor 31 transfers the provision information to the communication device 33 to transmit the provision information to the server 5. It is preferable that the processor 31 transmit the provision information in association with the identification information (e.g., a user identification (ID) of the user PT1) to the server 5. As a result, the server 5 can store the provision information in association with the user ID of the user PT1, as shown in FIG. 3.

The link process 314 includes a voice output process 317. The voice output process 317 includes output of the voice for the dialogue with the user PT1 from the speaker 15 during the period related to the treatment of the pre-finishing massage. The processor 31 executes the information generation process 315 in parallel with the voice output process 317, and generates the provision information by using the voice data from the microphone 14. That is, the processor 31 generates the provision information from the voice data obtained by the dialogue with the user PT1 during the period related to the treatment of the pre-finishing massage.

The period related to the treatment of the pre-finishing massage is, as an example, a period during the treatment of the pre-finishing massage. As a result, the provision information is generated based on the dialogue with the user PT1 during the treatment of the pre-finishing massage. In this case, the voice data indicative of the effect of the pre-finishing massage can be obtained.

The period related to the treatment of the pre-finishing massage may be, as another example, a period after the pre-finishing massage is terminated. As a result, the provision information is generated based on the dialogue with the user PT1 after the treatment of the pre-finishing massage. In this case, the voice data indicating, for example, the effect of the pre-finishing massage or a desire for the finishing massage can be obtained.

The period related to the treatment of the pre-finishing massage may be, as another example, a period before the start of the pre-finishing massage. As a result, the provision information is generated based on the dialogue with the user PT1 before the treatment of the pre-finishing massage. In this case, the voice data such as an expectation for the pre-finishing massage or a desire for the finishing massage can be obtained.

Figure 4:
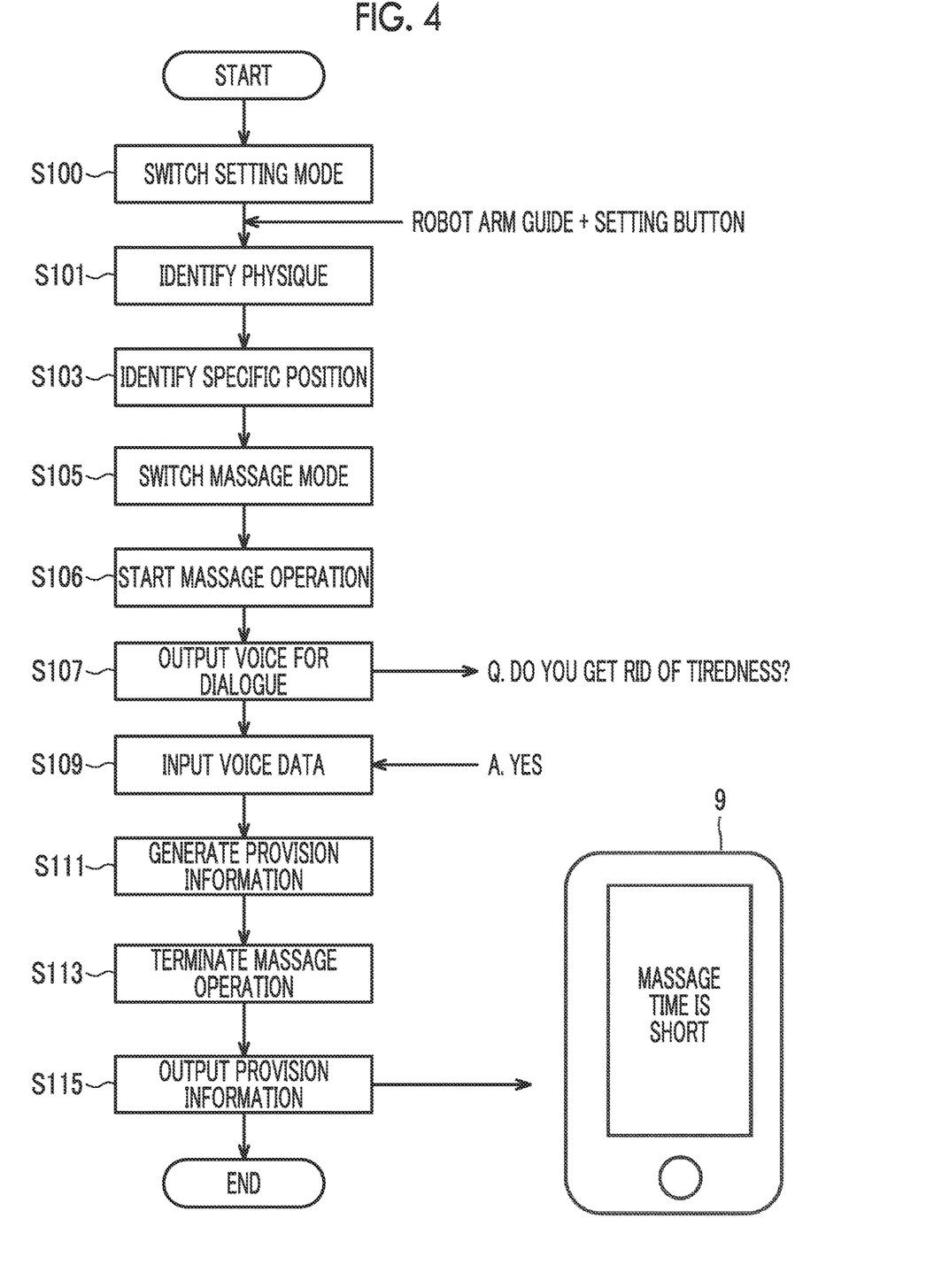
FIG. 4 is a diagram describing a flow of treatment of massage with respect to a user by using the massage system, according to one embodiment.

With reference to FIG. 4, a flow of the treatment of the massage with respect to the user PT1 by using the system 100 will be described. A process of FIG. 4 is started in a case in which the user PT1 is guided to the first massage room R1 of FIG. 1 and is laid down on the bed 21. The massage device 1 is disposed on the bed 21 in advance.

With reference to FIG. 4, when starting to at the start of use of the massage device 1, setting of the position of the massage device 1 with respect to the user PT1 is performed. An instruction for starting the use is provided to the computing device 3, for example, by the operator pressing a start button displayed on the touch panel 13.

The processor 31 of the computing device 3 switches the operation mode to the setting mode (step S100). In step S100, the processor 31 outputs the control signals to the lock units 12a and 17a to perform the lock-off operation.

In the setting mode, the operator such as the therapist PT2 guides the robot arm 10 by hand or the like to recognize the setting position. As an example, an example of setting reference positions P1, P2, and P3 will be described with reference to FIG. 2. The reference positions P1, P2, and P3 are a left shoulder, a right shoulder, and a center position of a waist of the user PT1, respectively.

With reference to FIG. 2, the operator guides the robot arm 10R in the longitudinal direction of the bed 21 to a position in which the massage hand 10a reaches the reference position P1. As a result, the movement device 12 is moved in a direction indicated by arrow S. The operator places the massage hand 10a on the left shoulder of the user PT1, which is the reference position P1, and in that state, presses the setting button 13A for providing an instruction for the setting of the reference position. Then, the operator places the massage hand 10a on the right shoulder of the user PT1, which is the reference position is P2, and in that state, presses the setting button 13A for providing an instruction for the setting of the reference position. Finally, the operator places the massage hand 10a on the center position of the waist of the user PT1, which is the reference position is P3, and in that state, presses the setting button 13A for providing an instruction for the setting of the reference position.

The processor 31 of the computing device 3 executes the identification process 311 by receiving the input of the operation signal of the setting button 13A in the setting mode, and identifies corresponding positions of the massage hands 10a as the reference positions P1 and P2, P3.

After the predetermined reference positions P1, P2, and P3 are identified, the processor 31 identifies the physique of the user PT1 based on the positions (step S101). Specifically, with reference to FIG. 2, the processor 31 identifies an interval W between the reference positions P1 and P2 from the shoulder width of the user PT1. Further, the processor 31 identifies an interval H between a middle point of the reference positions P1 and P2 and the reference position P3 as a length from the shoulder to the waist of the user PT1. The processor 31 stores in advance the intervals W and H with respect to the physique required for the massage, and uses the obtained intervals W and H to identify the physique of the user PT1 required for the massage.

In another example, the setting position includes the specific position. The specific position refers to the position for designating the adjustment of the massage operation. The adjustment of the massage operation includes an adjustment of intensity, and an adjustment of the massage content. The content of the massage may include, for example, a massage position, a skill corresponding to the massage operation, or the like. The specific position includes, specifically, the focused treatment position such as the place with stiffness, or the treatment contraindication position such as the place in which the massage is not desired. The position is perceived by the operator by listening to the user PT1 before the treatment, and is set in the massage device 1 by the setting of the position.

When a specific position P4 is set, with reference to FIG. 2, the operator guides the robot arm 10R in the longitudinal direction of the bed 21 to a position in which the massage hand 10a reaches the specific position P4. As a result, the movement device 12 is moved in the direction of the arrow S. The operator places the massage hand 10a on the site of the user PT1, which is the specific position P4, and in that state, presses the setting button 13B for providing an instruction for the setting of the specific position.

The processor 31 of the computing device 3 executes the identification process 311 by receiving the input of the operation signal of the setting button 13B in the setting mode, and identifies the position of the massage hands 10*a* in that case as the specific position P4 (step S103).

The setting of the position is not limited to the method described above. In another example, as shown in an enlarged view of a part B of FIG. 5, the massage system may include a reading device such as a camera 13C or the like at a side of the robot arm 10R facing the user PT1 to read markers M1 to M4 installed on an upper surface of the user PT1. Also, in another example, the camera 13C may be provided on the other robot arm 10L, or may be provided on each of the robot arm 10R and the robot arm 10L. In this case, by installing the markers M1, M2, and M3 indicating the reference positions P1, P2, and P3 at the left shoulder, the right shoulder, respectively, and the center position of the waist of the user PT1, the processor 31 can identify the physique of the user PT1. In addition, by installing the marker M4 indicating the specific position P4 at a position to be the specific position P4, the processor 31 can identify the specific position P4.

Figure 5:
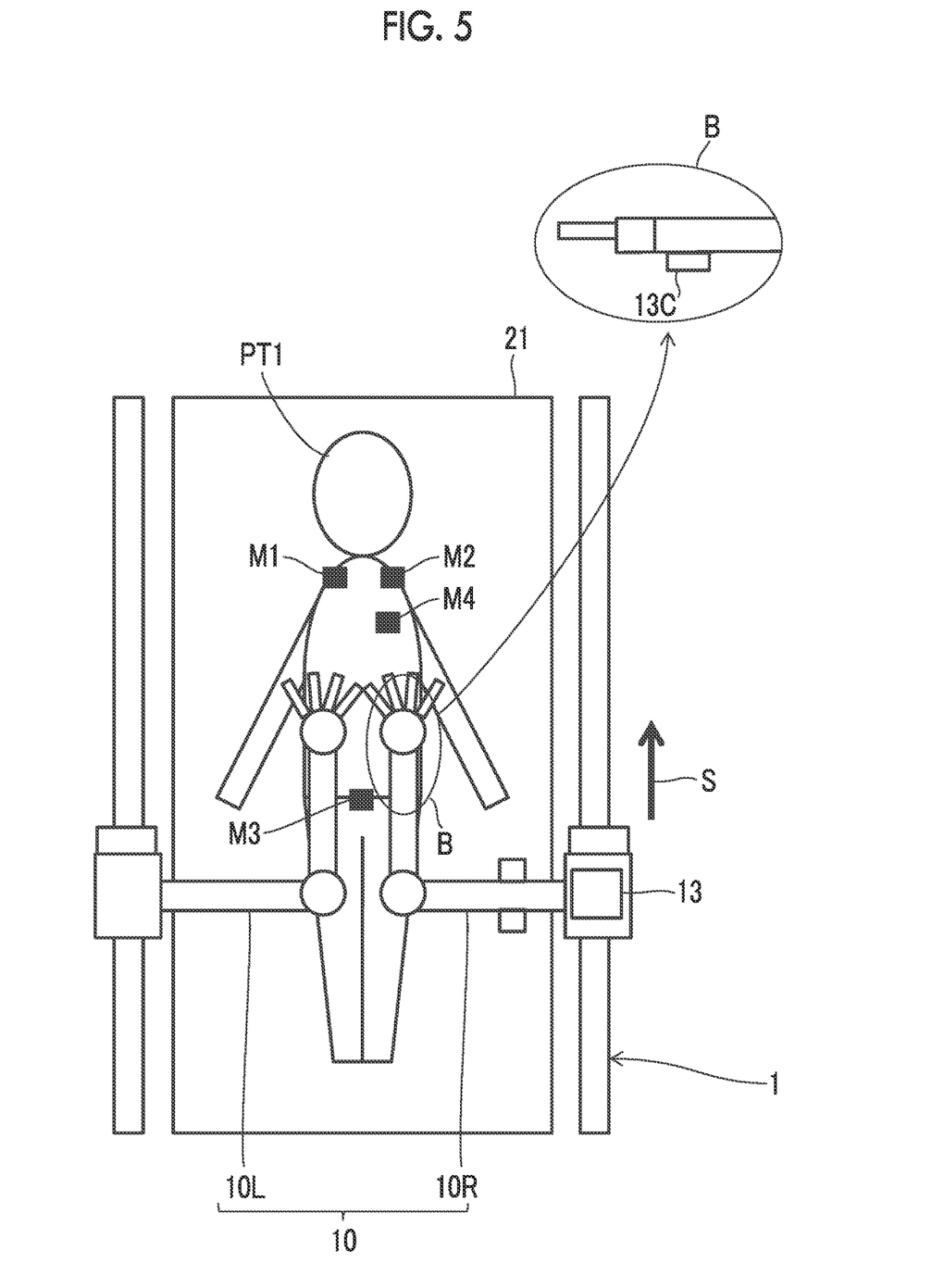
FIG. 5 is a diagram describing another example of the setting operation of the setting position by using the robot arm of the massage device, according to one embodiment.

Note that in this example, the setting of the position is performed by using one robot arm 10R of the two robot arms 10R and 10L. In this case, the position of each of a plurality of the robot arms in the massage operation is set by the position set by using one robot arm 10. Note that, in another example, the setting of the position may be performed by using all of the robot arms.

Since the massage device 1 is a movable type whose position is not fixed with respect to the bed 21, when the massage device 1 is moved to the vicinity of the bed 21, there is a possibility that the position with respect to the bed 21, that is, the position with respect to the user PT1 is not an appropriate position with respect to the treatment position. However, by performing the setting of the position as described above, the massage hand 10*a* can be appropriately moved to the treatment position in the subsequent massage operation. That is, even when the movable type massage device 1 is used with respect to the bed 21, a positional relationship with the user PT1 can be a suitable positional relationship. As a result, an effective massage can be performed with respect to the user PT1.

When the setting of the position described above is terminated, the processor 31 switches the operation mode to the massage mode (step S105). In this mode, the processor 31 applies the physique of the user PT1 identified in step S101 and the specific position identified in step S103 to the massage operation program. The application includes setting of the position of the massage in response to the program to the position depending on the user PT1, setting of the massage intensity or the massage content at the specific position depending on the user PT1, and the like.

Then, the processor 31 starts the massage operation (step S106). As a result, the massage device 1 performs the programmed massage operation, and the treatment of the programmed pre-finishing massage is performed with respect to the user PT1. Therefore, high quality treatment is performed regardless of the skill of the masseur. Further, by performing the massage operation depending on the positions set in steps S101 and S103, the treatment of the pre-finishing massage suitable for the user PT1 is performed.

During the massage operation, the processor 31 outputs the voice for the dialogue from the speaker 15 at predetermined timing (step S107), and receives the input of the voice data from the microphone 14 (step S109). In an example, the voice for the dialogue output in step S107 is output when the massage operation is terminated. In this case, as the voice for the dialogue output in step S107, a question about the treatment effect such as "Did you get rid of tiredness?" is presented. The voice data input in step S109 in this case is an answer to the above question, and is a voice such as "yes" or "no" indicating the treatment effect.

Note that as another example, the voice for the dialogue output in step S107 is output during the massage operation. In this case, a question about an impression or a request during treatment such as "Does it hurt?" is presented. The voice data input in step S109 in this case is an answer to the above question, and is a voice such as "yes" or "please massage more strongly" indicating the impression or the request.

Note that the processor 31 may output the voice for the dialogue in the same manner even after the massage operation is terminated, and receive the input of the voice data from the microphone 14. In this case, as the output voice for the dialogue, a question of the request for the finish massage, such as "Where do you want the finishing massage?" is presented. The voice data input in this case is an answer to the above question and is a voice such as "right shoulder", "left arm", or the like indicating the request for the finishing massage.

Based on the voice data input as described above, the processor 31 executes the information generation process 315 to generate the provision information (step S111). As an example, in the information generation process 315, the processor 31 includes a learning model 51, and obtains the provision information by inputting the obtained voice data to the learning model 51.

Figure 6:
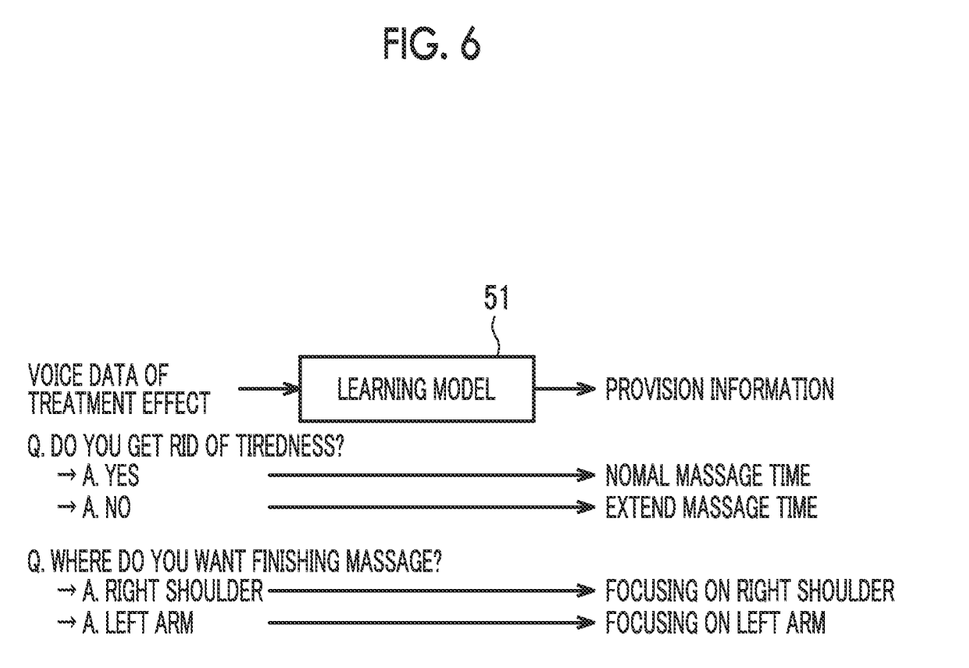
FIG. 6 is a diagram describing a method of machine training of a learning model used in the computing device, according to one embodiment.

The learning model 51 is a machine-learning model as shown in FIG. 6. That is, with reference to FIG. 6, the learning model 51 is machine-learned by using, as a supervised model, a combination of a plurality of data in which the voice data is the input data and the information related to the finishing massage is the output data. For example, the learning model 51 is learned by using the voice data of "yes" with respect to the specific question of "Did you get rid of tiredness?" as the input data, and data indicating that "set time for finishing massage to be normal" as the output data. In addition, the learning model 51 is learned by using the voice data of "no" as the input data, and data indicating that "extend time for finishing massage" as the output data. In addition, the learning model 51 is learned by using the voice data of the "right shoulder" with respect to "Where do you want the finishing massage?" as the input data, and data indicating an instruction of "focus on the right shoulder" as the output data. Further, the learning model 51 is learned by using the voice data of the "upper left" as the input data, and the data indicating the instruction of "focus on the upper left" as the output data.

The training of the machine learning model 51 is not limited to the learning by using the voice data as the teacher model. Alternatively, the learning model 51 may perform the learning in which another data is used as supervisory data in addition to the voice data. In another example, the learning model 51 may be learned by using a history (for example, operation history) of the massage position or the massage time in the massage device 1 as the input data, and the massage position or the massage time in the subsequent finishing massage as the output data. Further, as another example, the learning model 51 may be machine-learned by using the focused treatment position or the treatment contraindication position, which is the setting position, as the input data, and the massage position or the massage time in the subsequent finishing massage as the output data. Note that the input data and the output data may be map data schematically showing the body of the user.

By using such a learning model 51, in step S111, the processor 31 can easily obtain the provision information output from the learning model 51 by inputting the voice data to the learning model 51.

Note that as another example, the processor 31 may store the provision information corresponding to the voice data in advance and output the provision information corresponding to the input voice data. For example, the processor 31 may store the provision information corresponding to a specific term in advance, perform a voice analysis on the input voice data, and read out the provision information corresponding to the obtained term.

Further, the processor 31 may change the parameters of the massage operation program so as to perform the massage operation in response to the request based on the input voice data. As a result, the user PT1 can receive a suitable massage as a case in which the user PT1 receives the massage while performing the dialogue with the massager.

After a series of the massage operations is terminated (step S113), the processor 31 outputs the provision information generated in step S111 (step S115). When the pre-finishing massage is terminated, the user PT1 is guided to the second massage room R2 in FIG. 1. The user PT1 waits for the finishing massage by the therapist PT2 while lying down on the bed 22.

The output in step S115 causes, for example, the communication device 33 to transmit the provision information to the terminal device 9 carried by the therapist PT2, the server 5 accessible by the terminal device 9, or the like. As a result, the provision information is provided to the therapist PT2 who performs the finishing massage on the user PT1 in the second massage room R2.

The provision information is information for performing the finishing massage linked to the pre-finishing massage, such as "the massage time is short" shown in FIG. 4. As a result, the therapist PT2 can perform the finishing massage after the pre-finishing massage. That is, in the system 100, the massage device 1 performs the pre-finishing massage, and thereby alleviate thus the burden on the therapist PT2. In addition, the massage service can be efficiently provided with a fewer number of the therapists PT2.

As a result, as shown in FIG. 1, the pre-finishing massage and the finishing massage can be performed with respect to the user PT1 in different locations by using the system 100. In such a case, the therapist PT2 who performs the finishing massage may not perceive the state of the user PT1 during the pre-finishing massage or after the pre-finishing massage. Even in such a case, by providing the provision information based on the voice data in that case, the finishing massage linked to the pre-finishing massage can be performed.

Also, since the provision information is stored in the server 5 in association with the identification information of the user PT1, the provision information can be used as medical record information related to the massage. Specifically, by storing the provision information together with the content of the pre-finishing massage for each user PT1, it can be used as a reference data in a case of the next treatment.

Note that the provision information may be provided to the user PT1. In that case, the massage device 1 may further include an output device for the user PT1. The output device for the user PT1 is, for example, a display installed at a position that is easy to see from the user PT1 who lies down on the bed 21. Alternatively, the provision information provided to the user PT1 may be output by the voice from the speaker 15. In this case, for example, the provision information may be output in a dialogue type. As a result, the user PT1 can also recognize the information for the finishing massage.

Furthermore, the provision information provided to the user PT1 may be different from the provision information provided to the therapist PT2. In this case, the processor 31 generates the provision information provided to the user PT1 together with the provision information provided to the therapist PT2 in step S111. The provision information provided to the user PT1 may have a different expression from the provision information provided to the therapist PT2, or may have an additional description. As a result, the information useful for both the user PT1 and the therapist PT2 can be provided.

3. Supplementary Note

It should be understood that the invention is not limited to the above-described embodiment, but may be modified into various forms on the basis of the spirit of the invention. Additionally, the modifications are included in the scope of the invention.

What is claimed is:

1. A massage system for a massage facility in which a robot arm is provided and a massage is performed on a user by the robot arm, the system comprising:
    a control unit configured to cause the robot arm to perform a massage operation in response to a program;
    a movement device configured to move the robot arm in response to a control signal from the control unit, and including a lock unit configured to inhibit or release a movement of the robot arm; and
    a setting unit configured to receive a setting operation of a setting position used for the massage operation from an operator,
    wherein the control unit is configured to
        cause the robot arm to perform the massage operation with respect to a treatment position based on the setting position, and
        identify the setting position by having the operator guide the robot arm,
    wherein the lock unit is configured to switch the movement device between (i) a setting mode enabling the operator to guide the robot arm to the setting position, and (ii) a massage mode disabling the operator from guiding the robot arm to the setting position,
    wherein the robot arm includes a reading device,
    wherein the reading device is configured to read a marker installed at a position of a body of the user, the position corresponding to the setting position, and
    wherein the control unit is configured to recognize the setting position by having the reading device read the marker.

2. The massage system according to claim 1,
    wherein the setting position includes a reference position depending on a physique of the user.

3. The massage system according to claim 1,
    wherein the setting position includes a specific position for designating an adjustment of the massage operation.

4. The massage system according to claim 1,
    wherein the setting position includes a reference position depending on a physique of the user and a specific position for designating an adjustment of the massage operation, and
    the setting unit is further configured to separately set the reference position and the specific position.

5. The massage system according to claim 1,
wherein the setting unit includes an operation unit that is disposed at a position in which the setting unit is operable during the guide and configured to determine that a position of the robot arm is the setting position.

6. A massage device for a massage facility in which a pre-finishing massage is performed by the massage device with respect to a person being treated, the device comprising: a computing device, wherein the computing device is configured to control a robot arm to perform the pre-finishing massage, generate provision information to be provided to a therapist for performing a finishing massage after treatment of the pre-finishing massage, from information obtained during the treatment of the pre-finishing massage, and output the provision information after the treatment of the pre-finishing massage.

7. The massage device according to claim 6,
wherein the provision information includes information indicating a treatment content of the pre-finishing massage.

8. The massage device according to claim 6,
wherein the provision information includes information indicating a treatment effect of the pre-finishing massage.

9. The massage device according to claim 6, further comprising:
a microphone,
wherein the computing device is configured to input voice data obtained by the microphone during a period related to the treatment of the pre-finishing massage to a learning model, which is machine-learned to provide output information with respect to input of the voice data, and obtain the output information provided from the learning model, and
the provision information includes the output information.

10. The massage device according to claim 9,
wherein the voice data includes data indicating a treatment effect of the pre-finishing massage, which is obtained from utterance of the person being treated.

11. The massage device according to claim 9, further comprising:
a speaker,
wherein the computing device is configured to output voice for a dialogue with the person being treated from the speaker during the period related to the treatment of the pre-finishing massage.

12. The massage device according to claim 6,
wherein the computing device is configured to store the provision information in association with specific information of the person being treated in a storage device, the storage device accessible by another device.

* * * * *